US005226337A

United States Patent [19]

Imanishi et al.

[11] Patent Number: 5,226,337

[45] Date of Patent: Jul. 13, 1993

[54] SLIDE DRIVING APPARATUS OF PRESS MACHINE

[75] Inventors: Shozo Imanishi, Sagamihara; Masakazu Hashimoto, Machida; Touru Miyashita, Sagamihara; Osamu Mishima, Sagamihara; Takao Ito, Sagamihara, all of Japan

[73] Assignee: Aida Engineering Ltd., Kanagawa, Japan

[21] Appl. No.: 828,045

[22] Filed: Jan. 30, 1992

[30] Foreign Application Priority Data

Mar. 19, 1991 [JP] Japan .................................. 3-081958
Mar. 19, 1991 [JP] Japan .................................. 3-081959

[51] Int. Cl.[5] .............................................. F16H 21/18

[52] U.S. Cl. ........................................... 74/45; 74/52; 74/393

[58] Field of Search ........................ 74/25, 45, 52, 393

[56] References Cited

U.S. PATENT DOCUMENTS

| | | | |
|---|---|---|---|
| 2,255,614 | 9/1941 | Fox | 74/52 X |
| 2,775,128 | 12/1956 | Young | 74/52 X |
| 3,572,137 | 3/1971 | Nakano | 74/44 |
| 3,869,927 | 3/1975 | Lose et al. | 74/44 |
| 3,971,261 | 7/1976 | Matsushita | 74/52 |
| 4,697,466 | 10/1987 | Sugawara et al. | 74/27 |

FOREIGN PATENT DOCUMENTS

| | | |
|---|---|---|
| 60-154896 | 1/1984 | Japan . |
| 60-154897 | 1/1984 | Japan . |
| 62-275599 | 11/1987 | Japan . |
| 1-40634 | 12/1989 | Japan . |

*Primary Examiner*—Allan D. Herrmann
*Attorney, Agent, or Firm*—Lowe, Price, LeBlanc & Becker

[57] ABSTRACT

A Slide driving apparatus of press machine, wherein a main gear 3 as a rotational drive member and a lever member 10 as a driven member are opposed to one another in a eccentric state which an axes $O_1$ and $O_2$ are separated, the main gear 3 and the lever member 10 being connected to one another by a connecting member 13 consisting of a pin member 11 and a bush member 12. A drive rotation locus A which can be traced, round the axis $O_1$, by a movement of a connecting center $O_5$ where the main gear 3 and the connecting member 13 are connected, and a driven rotation locus B which can be traced, round the axis $O_2$, by a movement of a connecting center $O_4$ where the lever member 10 and the connecting member 13 are connected, intersect one another at points of C and D. A slide of the press machine is connected, by the connecting rod, to an eccentric portion 8A of the crankshaft 8 where the lever member 10 is fixed.

6 Claims, 11 Drawing Sheets

SLIDE DRIVING APPARATUS OF PRESS MACHINE

BACKGROUND OF THE INVENTION

1. Field of the Invention

The present invention relates to a driving apparatus for a slide in a press machine which reciprocates up and down.

2. Description of the Related Art

There is a conventional press machine which attains a precise press and an efficient production, because of a slide which decreases its down-speed beyond certain level from a bottom dead center which means the lowest position of the slide through its reciprocal movement. Such systems as using a slip element (described in Japanese Utility Model Application Laid-open No. 1-40634) and an eccentric link (described in Japanese Patent Application Laid-open No. 62-275599) are well-known in this art. The slip-element type system is schematically shown in FIGS. 4 and 5. The eccentric-link type system is shown in FIGS. 6 and 7.

In FIGS. 4 and 5, a pinion 51 is driven by a motor as a drive source and fits into a main gear 52. A lever 53 opposite the main gear 52 is fixed to one end of a crankshaft 54 of which an eccentric portion 54A is connected with a slide 56 by means of a connecting rod 55 that comes in therebetween. The lever 53 has a long guide groove 53A on its surface so that a slip element 58, on a forward end of a rotation axle 57 provided on the main gear 52, can move along the guide groove 53A. A rotation axis $O_6$ for the main gear 52 is offset from a rotation axis $O_7$ for the lever 53 (an axis of the crankshaft 54 as well) by $e_3$.

When the main gear 52 is rotated by the pinion 51, the slip element 58 moves the lever 53 and the crankshaft 54 to translate the slide 56 either upwardly or downwardly. AS shown in FIG. 5, when the lever 53 is rotated around the axis $O_7$ at an angle of 180 degrees from a position shown in solid line to another position 53' shown by dotted line, the main gear 52 will rotate round the axis $O_6$ at an angle of $\theta_3$. Following this shift, if the lever 53 is further rotated at an angle of 180 degrees so as to return to the solid line position, the main gear 52 will rotate at an angle of $\theta_4$. Since the axis $O_7$ differs from the axis $O_6$, the angle $\theta_3$ is less than 180 degrees and the angle $\theta_4$ is greater than 180 degrees. Accordingly, if the main gear 52 constantly rotates and the slide 56 stays at its bottom dead center when the lever 53 is at the solid line position, it will not take more time for the slide 56 to move from its bottom dead center to top dead center (that is, to move upwardly) than to move from its top dead center to bottom dead center (that is, to move downwardly). In consequence, the upward motion of the slide is quick.

The following explanation for the eccentric-link type system is made with reference to FIGS. 6 and 7. Therein, a pinion 61 driven by a motor, as a drive source, fits into a main gear 62 which turns by means of a set of bearings 63. A rotating crankshaft 64 mounted to bearings 63 is connected to a slide 66 by means of a connecting rod 65. The connection between the crankshaft 64 and the connecting rod 65 is made with an eccentric portion 64A. A yoked type lever portion 64B is provided on a surface of the crankshaft 64 between the bearings 63 and is connected to a yoked type main portion 62A of the main gear 62 by means of a link 67 which is joined with these two portions by pins 68 and 69. A rotation axis $O_8$ for the main gear 62 is offset from a rotation axis $O_9$ for the lever portion 64B (an axis of the crankshaft 64 as well) by $e_4$.

When the pinion 61 drives the main gear 62, this motion will be transmitted to the crankshaft 64 via link 67 and lever portion 64B so as to move the slide 66 upwardly or downwardly. In FIG. 7, when the pin 68 of the crankshaft 64 is rotated round the axis $O_9$ at an angle of 180 degrees and consequently shift to a position 68' drawn by dotted line, that is, when the crankshaft 64 is rotated at an angle of 180 degrees, the pin 69 of the main gear 62 will shift from a position drawn by solid line to another position 69' drawn by dotted line on the axis $O_8$. In this situation, a rotation angle of the main gear 62 becomes $\theta_5$. Following this change in position, when the crankshaft 64 further turn at an angle of 180 degrees so that both the pins 68' and 69' return to the solid line positions, respectively, a rotation angle of the main gear 62 becomes $\theta_6$. Since the axis $O_9$ differs from the axis $O_8$, the angle $\theta_5$ is less than 180 degrees and the angle $\theta_6$ is greater than 180 degrees. Accordingly, if the main gear 62 constantly rotates and the slide 66 stays at its bottom dead center when the pins 68, 69 are at the respective positions shown by solid line, it will not take more time for the slide 66 to move from its bottom dead center to top dead center (that is, to move upwardly) than to move from its top dead center to bottom dead center (that is, to move downwardly). In consequence, the upward motion of the slide is quick.

FIG. 8 shows a slide motion denoted by "P" in the slip-element type system drawn in FIGS. 4 and 5 and a slide motion denoted by "Q" in the eccentric-link type system drawn in FIGS. 6 and 7. In FIG. 8, each phase angle of the crankshafts in both systems is adjusted so that both curve lines of the motions P and Q overlap one another from the top dead center to the bottom dead center of the slides. In the eccentric-link type system, when the rotation of main gear 62 is transmitted to the crankshaft 64 via the link 67, the rotation speed of the crankshaft 64 is varied from fast to slow, because of a constant angle swing round the pin 69. Accordingly, if the link 67 is disposed such that the slow down of the rotation speed of the crankshaft 64 occurs when the slide is almost at bottom bead center, the tilted angle (which shows a speed of the slide) of the motion $Q_{11}$ is less than that of the motion $Q_{10}$. Hence, the curve line of the motion Q becomes like a bottom shape of a wok (a deep round pan).

Because of such a curved slide motion Q, the slide speed in processing (pressing) becomes slow, so that a drawing press will work reliably to produce goods.

However, in the above-mentioned slide driving apparatus employing the eccentric-link type system, the following problems occur.

In FIG. 7, a circle denoted reference numeral E, around an axis $O_8$, defines a drive rotation locus of the center portion where the main gear 62 and the link 67 are connected one another by the pin member 69 when the main gear 62 rotates once. A circle denoted by reference numeral F, around an axis $O_9$, is a driven rotation locus of the center portion where the lever portion 64B of the crankshaft 64 and the link 67 are connected to one another by the pin member 68. FIG. 11 shows a swing angle $\beta$ of the link 67, when one rotation of the main gear 62 is transmitted to the crankshaft 64 as described in FIGS. 6 and 7. A length L caused by the swing angle $\beta$ can vary the rotation speed of the crankshaft 64 from fast to slow so as to trace the slide motion Q. While the link 67 moves such that the both end portions thereof trace the locus E and F respectively and swings at angle $\beta$ corresponding to one rotation of the main gear 62, the rotation speed of the crankshaft 64 fluctuates along a curve line G shown in FIG. 9, so that the speed of the slide 66 is effected by the fluctuated rotation of the crankshaft 64, which is described by a curve H in FIG. 10.

In FIG. 9, maximum rotation speed of the crankshaft 64 is $V_1$ and minimum speed is $V_2$. High precise pressing by the slide motion Q, as shown in FIG. 8, requires the tilted angle $\theta_{11}$ to be less than a certain value. To obtain such a tilted angle $\theta_{11}$, the ratio $V_1/V_2$ should be high because $V_1$ means high rotation speed of the crankshaft 64 owing to swing of the link 67 and $V_2$ means low rotation speed. But, according to the conventional eccentric-link type system, a difference in length between a radius $R_3$ of the drive rotation locus E and a radius $R_4$ of the driven rotation-al locus F is made large to keep the locus F inside of the locus E, so that the link 67 does not interfere with any other member while swinging. From a different view, the link 67 is made to have a certain length and be tilted toward the rotation direction so that the rotation of the main gear 62 is transmitted to that of the crankshaft 64. Accordingly, in order to increase $V_1/V_2$ to the certain value and obtain the length L by the angle $\beta$, the eccentric distance $e_4$, shown in FIGS. 6 and 7, should be long.

For these reasons, the rotational diameter of the above mechanism utilizing an eccentric portion is large, resulting in an unnecessarily large apparatus.

An object of the present invention therefore is to provide a miniaturized slide driving apparatus a miniaturization of the by miniaturizing a diameter of the rotation center portion.

SUMMARY OF THE INVENTION

An apparatus, in accordings to the present invention, for driving a slide by means of a crankshaft and a connecting rod in a press machine, comprises a rotational drive member capable of being rotated by a drive source and a corresponding driven member fixed to the crankshaft, such that both axes of the rotational drive member and the driven member are separated and opposed to one another; and a connecting member having two connecting centers, the first of which separates from the axis of the rotational drive member and is to be connected with the rotational drive member, the second of which separates from the axis of the driven rotation member and is to be connected with the driven rotation member, so that a drive rotation locus of the first connecting center around the axis of the rotational drive member and a driven rotation locus of the second connecting center around the axis of the driven rotation member intersect one another, an eccentric portion of the crankshaft being connected to the slide through the connecting rod.

Otherwise, an apparatus, in the present invention, for driving a slide by means of a crankshaft and a connecting rod in a press machine has: a rotational drive member capable of being rotated by a drive source and a corresponding driven member fixed to the crankshaft, such that both axes of the rotational drive member and the driven member are separated and opposed to one another; a pin member of which one end portion is standing out from one surface of either the rotational drive member or the driven member along each axis; and a bush member capable of rotating in a state to be coupled into either member which does not have the pin member, the pin member being coupled into the bush member at a distant point from an axis thereof and an eccentric portion of the crankshaft being connected with the slide through the connecting rod.

The preferred rotational drive member is the main gear driven by the pinion, but may also be a gear train or a disc-like member or a lever member which is driven by the drive shaft. The corresponding driven member is preferably a lever member, but a disc-like member or a lever member formed with the crankshaft is also available.

When the rotational drive member is rotated by the drive source, this motion will be transmitted to the driven member through the connecting member consisting of the pin member and the bush member. Subsequently, the crankshaft is rotated to make the slide go up and down reciprocally. Since the axis of the rotational drive member is separated from that of the driven member, return movement of the slide becomes quick.

When the rotation of the rotational drive member is transmitted to the driven member, the rotation speed of the crankshaft become irregular due to different axes. Also, the drive rotation locus and the driven rotation locus intersect one another, so that a gap between the maximum rotation speed and the minimum rotation speed becomes large. Therefore, even though the eccentric distance between the rotational drive member and the driven member is small, the ratio; maximum rotation speed against minimum rotation speed of the crankshaft, becomes high. In different view, the transmission from the rotational drive member to the driven member occurs through the bush member. A distance from an axis of the bush member to a center of the pin member which is coupled into the bush member, can correspond to a dimension of a link which is employed in a conventional eccentric-link type system. Such arrangement can attain a wide rotation angle of the bush member while drive member and the driven member rotate once. Hence, even though the dimension of the link in the present invention is short, a necessary length can be obtained so as to cause fluctuation of rotation speed for the crankshaft like in the conventional eccentric-link type system. Accordingly, the distance between axes of the rotational drive member and the driven member can be minimized, so that the diameter at the rotating portion where the eccentric portion of the apparatus is provided can be made small in size.

DETAILED DESCRIPTION OF THE PREFERRED EMBODIMENT(S)

Figure 1:
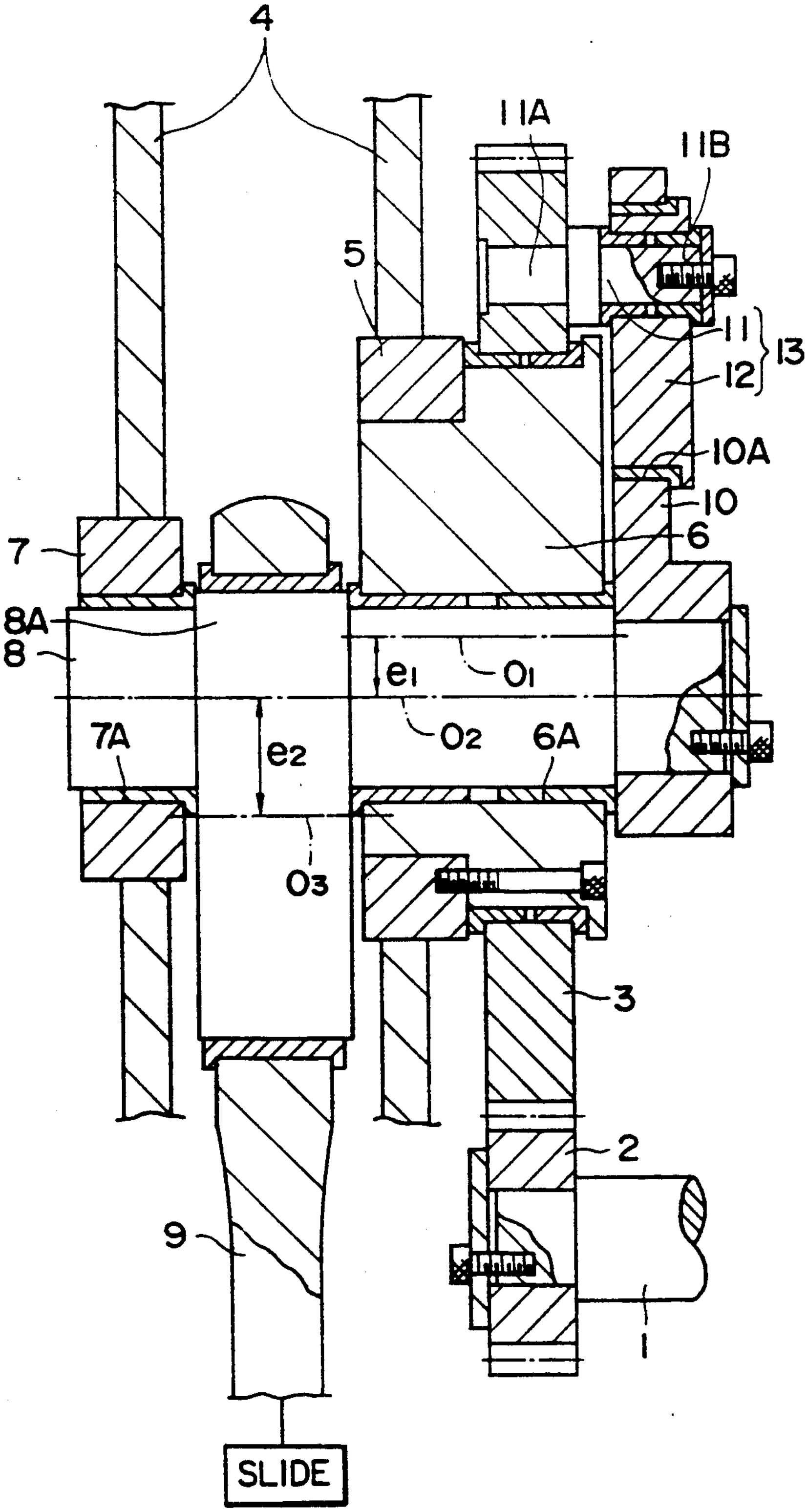
FIG. 1 is a front view of the apparatus in the preferred embodiment according to the present invention.
Figure 2:
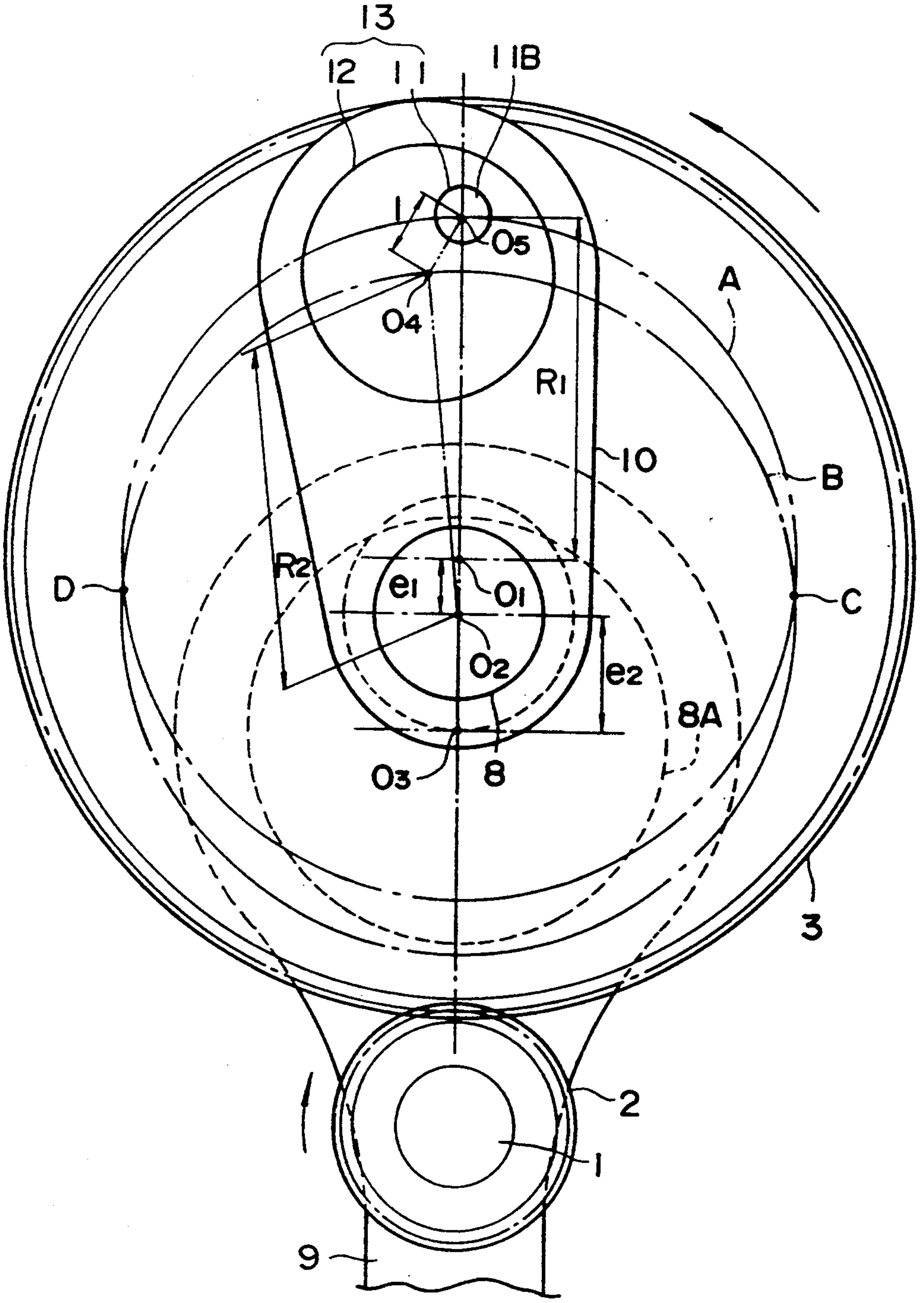
FIG. 2 is a schematic side view of the apparatus of FIG. 1.

FIG. 1 is a front sectional view of a preferred embodiment of the apparatus. In FIG. 1, a drive shaft 1 which is driven by a motor as a drive source has, on one end, a pinion 2 engaging a main gear 3. The main gear 3 so relates to a large diameter bearing member 6, which is held by a boss member 5 of a frame 4, that the gear 3 can be rotated by the pinion 2 around an axis $O_1$. The main gear 3 is used in this embodiment as a rotational drive member. The bearing member 6 has a hole 6A for holding one portion of a crankshaft 8. The other portion of the crankshaft 8 is also held by a boss member 7 at its inner hole 7A. An axis $O_2$ is separated from the axis $O_1$ by a distance of $e_1$. The crankshaft 8 has a round shaped eccentric portion 8A as shown in FIG. 2. An axis of the eccentric portion 8A is denoted by $O_3$ in the drawing and separated from the axis $O_2$ by a distance of $e_2$. The eccentric portion 8A is a portion to be connected with an upper portion of a connecting rod 9. A lower portion of the connecting rod 9 is connected to a schematically depict in FIG. 1 slide, so that the slide will reciprocate up and down two times longer than usual.

As shown in FIG. 1, one end portion of the crankshaft 8 projects from the bearing member 6 and has a lever member 10 extending along a radial direction of the crankshaft 8. The lever 10, which is rotated so as to correspond with the rotation of the main gear 3, is employed as a driven member in this embodiment. The axis of the lever 10 is the same as the axis $O_2$ of the crankshaft 8. Consequently, the lever 10 is eccentric from the main gear 3 by $e_1$ and opposes the main gear 3 on the same axis.

The main gear 3 has a hole in which a base portion 11A of a pin member 11 is inserted and held such that a portion of the pin member 11 stands out straight from one surface of the main gear 3. The lever member 10 has a hole 10A at nearly its forward end portion and distant from the axis $O_2$. The hole 10A is provided for holding a bush member 12 to rotate around the axis $O_4$ as shown in FIG. 2. As can be seen from FIG. 1, a forward end portion 11B of the pin member 11 is coupled into the bush member 12 and can rotate around an axis $O_5$ separating from the axis $O_4$.

The combination of the pin member 11 and the bush member 12 may be called a connecting member 13 for connecting the main gear 3 with the lever member 10. The axis $O_5$ is of a center for connecting the main gear 3 with one end portion of the connecting member 13 and the axis $O_4$ is of a center for connecting the lever member 10 with the other end portion of the connecting member 13. When the main gear 3 rotates once, the axis $O_5$ defines over the drive rotation locus A described in FIGS. 2 and 3 around $O_1$ and the axis $O_4$ does the driven rotation locus B around $O_2$. In this embodiment, the radius $R_1$ of the locus A is almost the same as the radius $R_2$ of the locii B, so that the locus A and B intersect one another at points C and D.

Operation of the preferred embodiment will now be explained.

Figure 3:
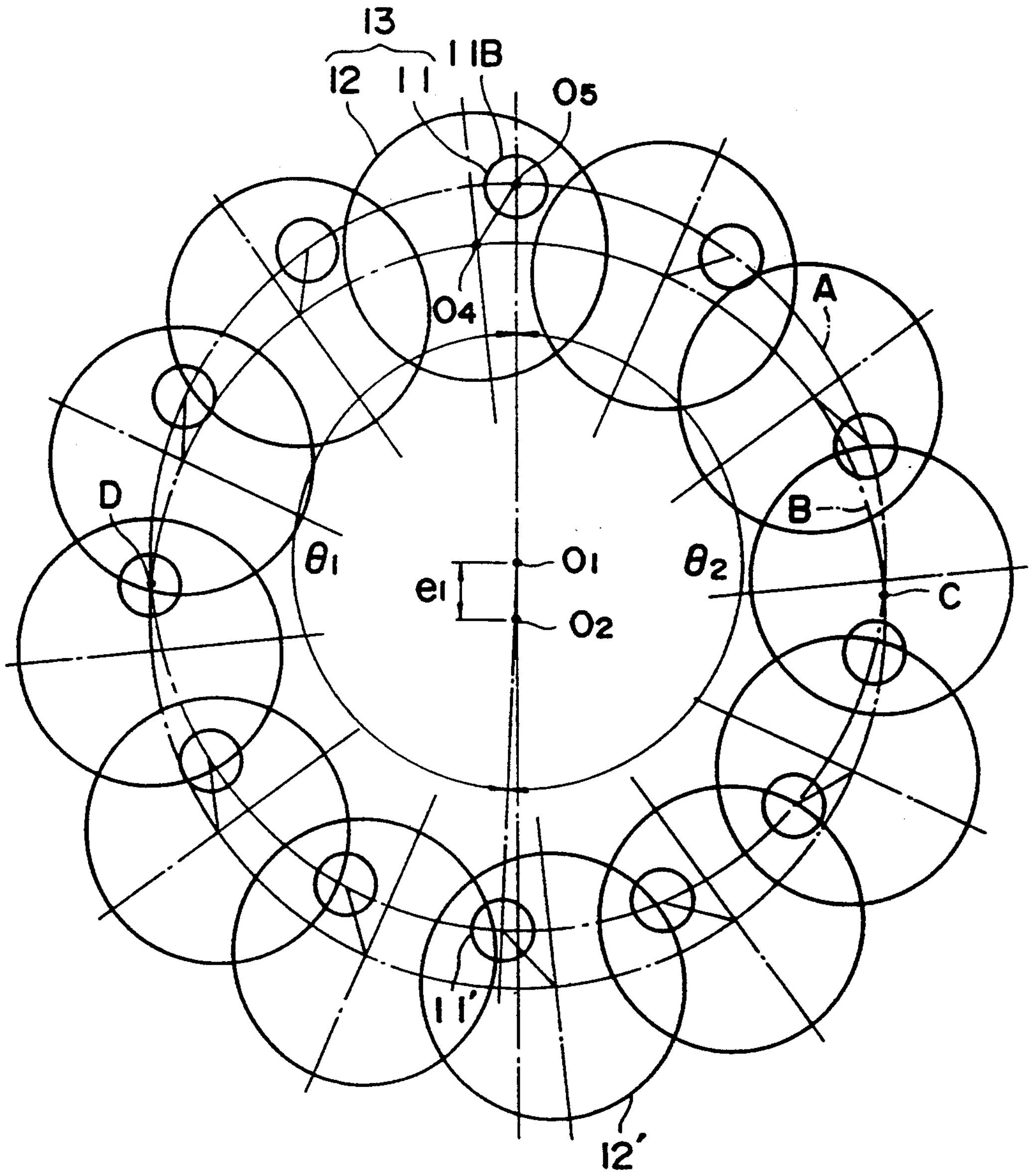
FIG. 3 is a schematic diagram for explaining the operation of the apparatus in FIGS. 1 and 2.
Figure 4:
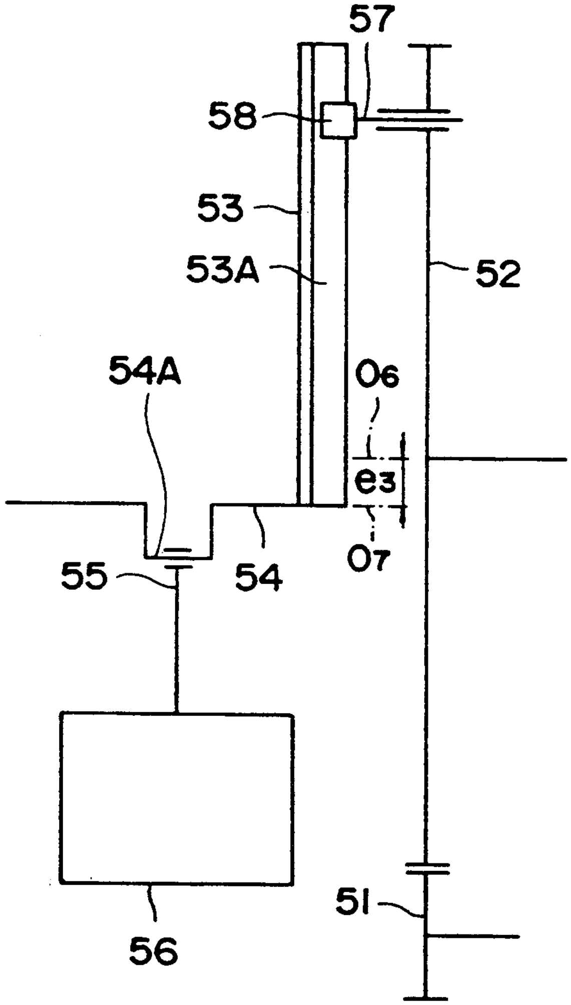
FIG. 4 PRIOR ART
FIG. 4 is a schematic representation showing the conventional apparatus employing a slip element type system.
Figure 5:
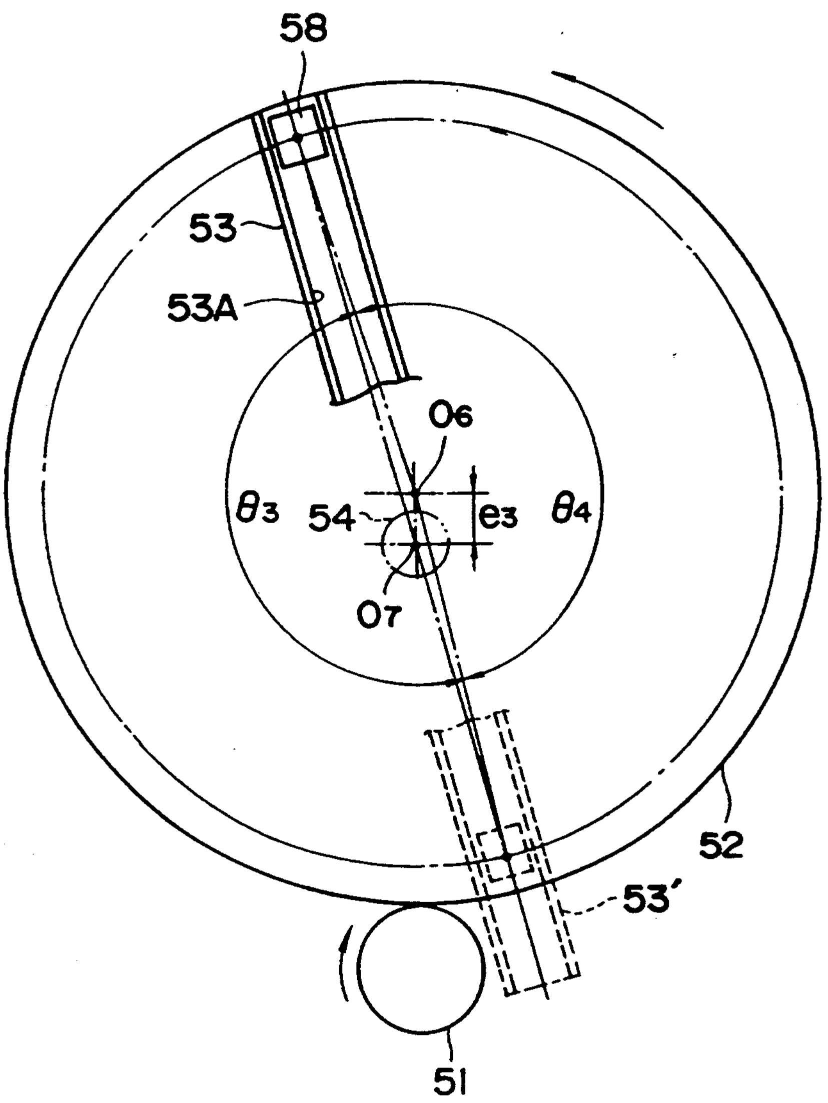
F I G. 5 PRIOR ART
FIG. 5 is a schematic diagram for explaining the operation of the conventional apparatus in FIG. 4.

When the main gear 3 is rotated by the pinion 2 around the axis $O_1$, such rotation will be transmitted to the lever member 10 through the pin member 11 and the bush member 12. Through this state, both the lever member 10 and the crankshaft 8 rotate around $O_2$, so that the slide will reciprocate up and down by means of the connecting rod 9. The rotational transmission from the main gear 3 as the rotational drive member to the lever member 10 as the driven member is achieved with the bush member 12 which is rotated at a certain angle around $O_4$ and with the pin member 11 which is rotated as well around $O_4$. Hence, the axis $O_5$ moves on the drive rotation locus A and the axis $O_4$ moves on the driven rotation locus B. When the movement along locus A of the axis $O_5$ around the axis $O_1$ occurs, that is, the rotation of the main gear 3, the lever 10 or the crankshaft 8 is finished once corresponding to the rotation of the bush member 12 around the axis $O_4$, so that the pin member 11, of which the forward end portion 11B is coupled into the bush member 12, will be shifted at an angle of certain degrees as shown in FIG. 3. Though the pin member 11 rotates around $O_4$, the pin member 11 does not interfere with any other member due to the connecting member 13.

In FIG. 3, when the bush member 12 moves to a position denoted by 12' after rotating at an angle of 180 degrees round the axis $O_2$, the pin member 11 is correspondingly changed to a position denoted by 11'. Through this motion, a rotation angle of the pin member 11 around the axis $O_1$ is equal to a rotation angle $\theta_1$ of the main gear 3. While, if the bush member 12 is returned from the position 12' to the prior position, the pin member 11 will be also replaced to its prior position. In this process, a rotation angle of the pin member 11 is equal to the rotation angle $\theta_2$ of the main gear 3. Since the axis $O_1$ is separated from the axis $O_2$ by a distance $e_1$, the angle $\theta 1$ is less than 180 degrees and the angle $\theta_2$ is greater that 180 degrees. Accordingly, if the positional relationship between the pin member 11 and the eccentric portion 8A of the crankshaft 8 is defined as shown in FIG. 2 and if the position of the slide shown in FIG. 2 is defined to be its bottom dead center, the necessary time for the slide to move from its bottom dead center to top dead center is shorter than the opposite motion. In consequence, the upward motion of the slide becomes quick.

In FIGS. 2 and 3, when the axes $O_4$ and $O_5$ go through an area where the driven rotation locus B is inside of the drive rotation locus A, that is, through an upper side of the intersecting points C, D of the loci A, B, the rotation speed of the main gear 3 is decreased and transmitted to the crankshaft 8. On the contrary, when the axes $O_4$ and $O_5$ go through an area where the driven rotation locus B is outside of the drive rotation locus A, that is, through a lower side of the intersecting points C, D of the loci A, B, the rotation speed of the main gear 3 is increased and transmitted to the crankshaft 8.

Figure 8:
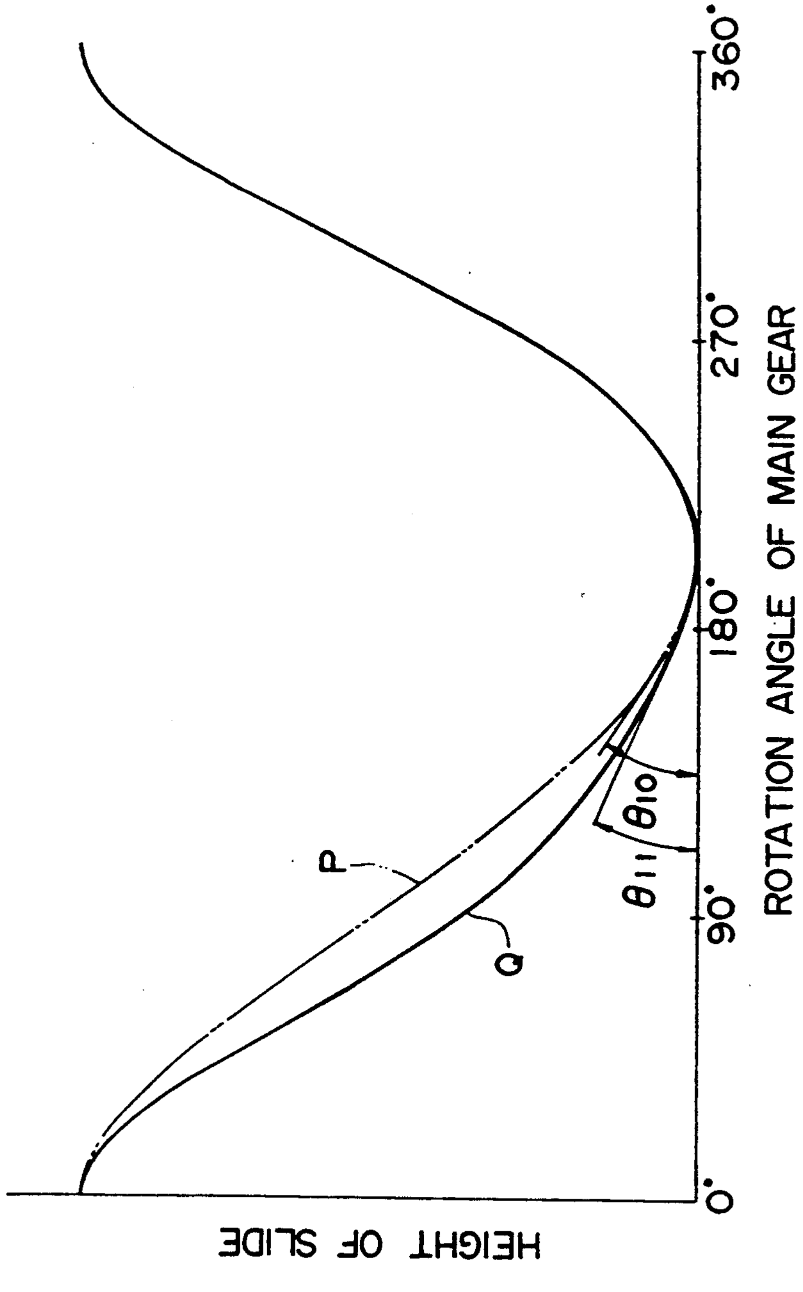
FIG. 8 PRIOR ART
FIG. 8 is a graphical representation of the slide motion which can return quickly.
Figure 9:
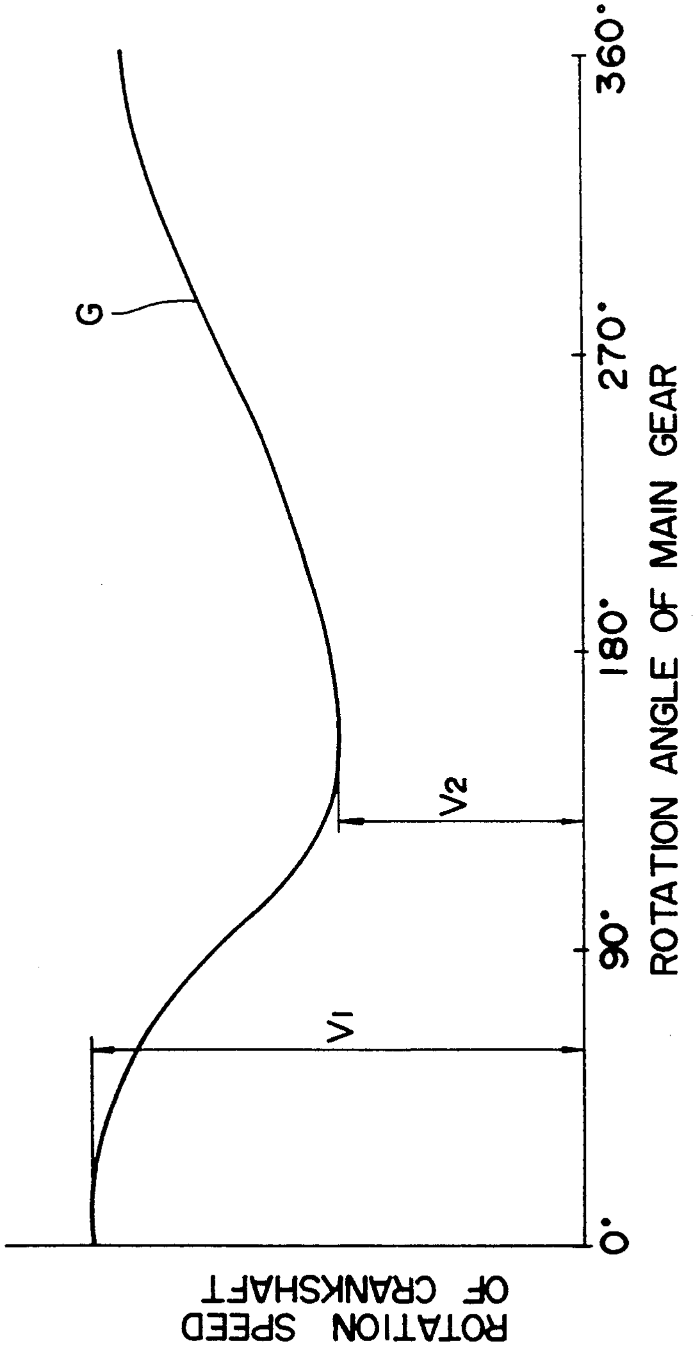
FIG. 9 PRIOR ART
FIG. 9 is a graphical representation of the rotation speed of the crankshaft.
Figure 10:
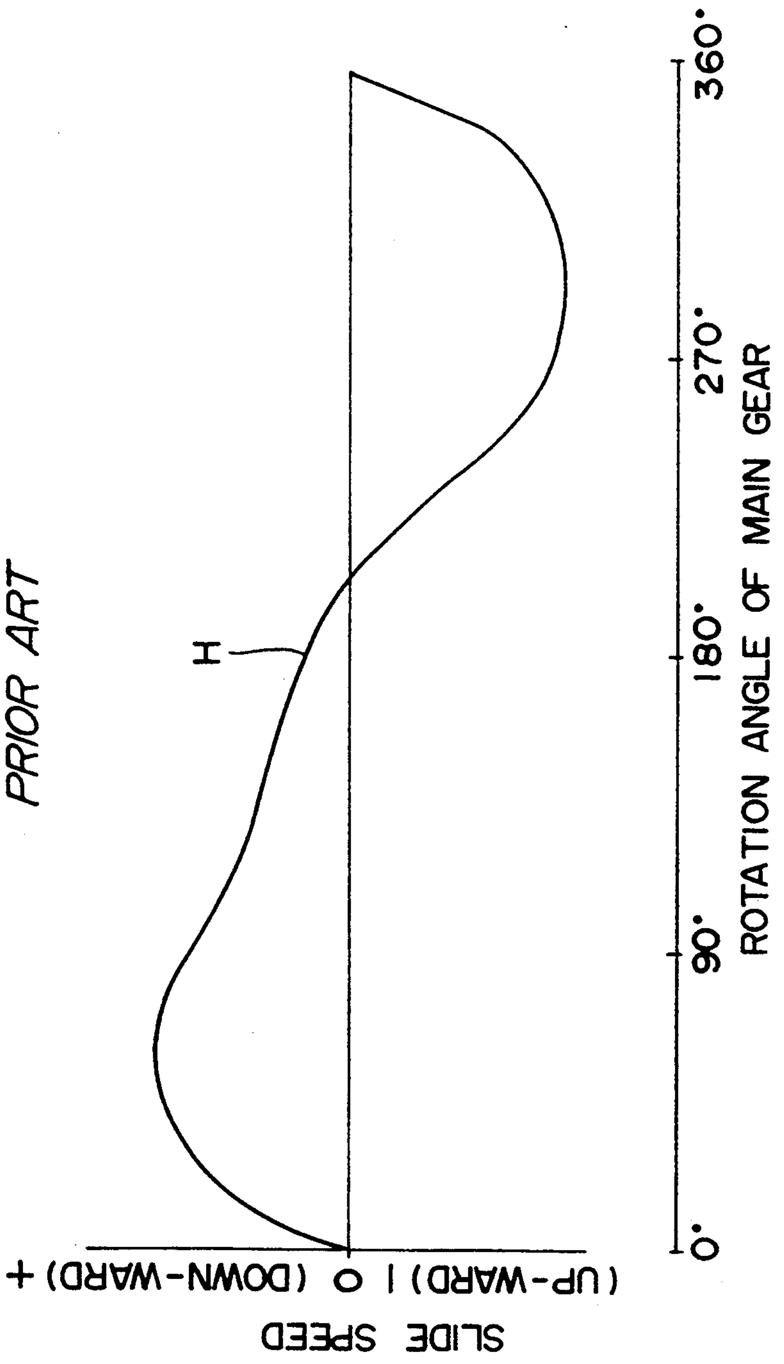
FIG. 10 PRIOR ART
FIG. 10 is a graphical representation of speed of slide the slide.

Since the loci A and B intersect at the points C and D, even though the eccentric distance $e_1$ from the axis $O_1$ to the axis $O_2$ is small, the rotation speed difference of the crankshaft 8 between its maximum and minimum is sufficient. Therefore, the ratio $V_1/V_2$ in FIG. 9 can be increased upon the necessity. This means to attain enough tilted angle $\theta_{11}$ in FIG. 8 so as to secure the slide motion Q for accurate pressing. Such small eccentric distance $e_1$ results in miniaturization of the apparatus, because the rotational center portion where the eccentric portion of the apparatus is provided, especially the diameter defined by the circumference of the bearing member 6 and the crankshaft 8, becomes small in size.

Figure 6:
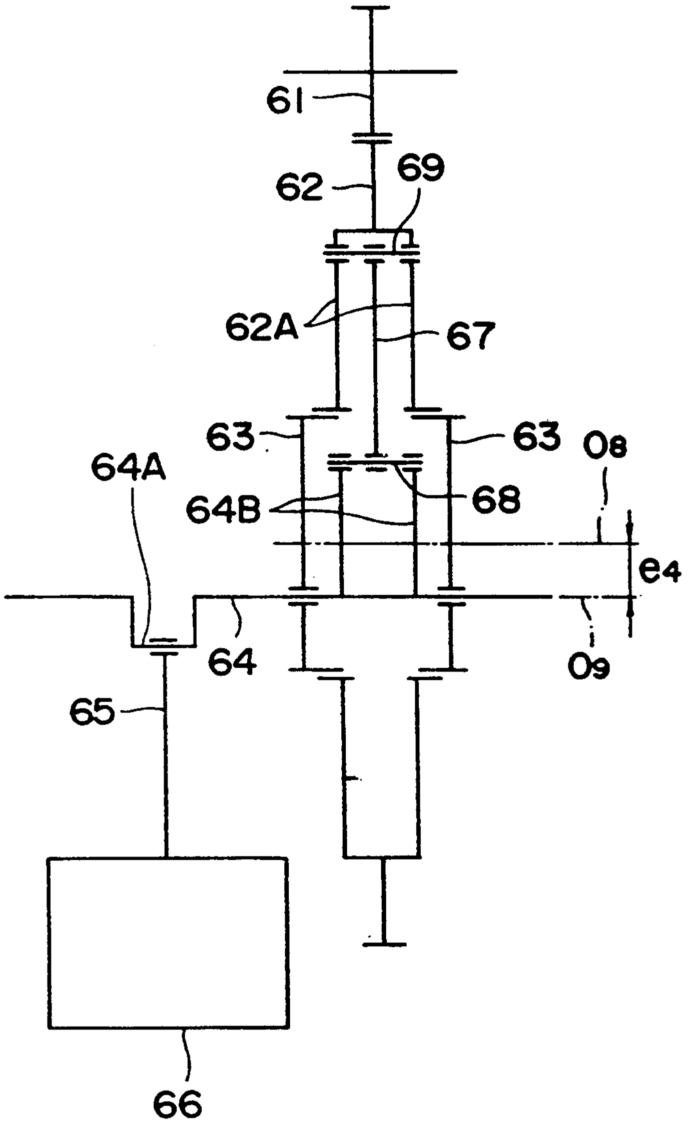
FIG. 6 PRIOR ART
FIG. 6 is a schematic representation of a conventional apparatus employing an eccentric-link type system.
Figure 7:
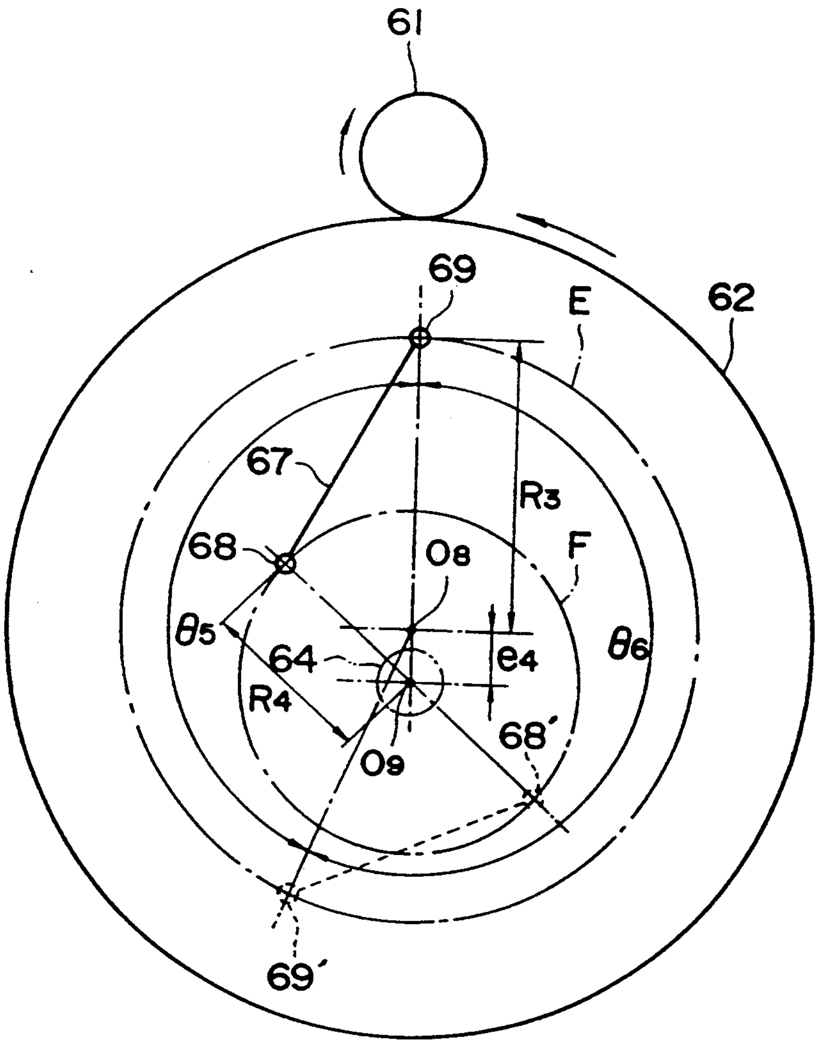
FIG. 7 PRIOR ART
FIG. 7 is a schematic diagram for explaining the operation of the conventional apparatus in FIG. 6.

As can be known from FIG. 2, a substantial length of the lever member 10 is shown by "$R_2$" which is a distance between two axes $O_2$ and $O_4$. A mechanism employed in this embodiment is defined with the lever member 10 having a length $R_2$ and a link having a length I from the axis $O_4$ to the axis $O_5$ of which one end portion is connected with the main gear 3. In mechanical view, such structure is likely to be the mentioned conventional apparatus having the lever portion 64B and the link 67, as shown in FIG. 6.

The apparatus, in this embodiment, employs the main gear 3 having the pin member 11 which is coupled into the bush member 12 rotating in the inside of the hole 10A of the lever member 10, so that the rotation of the main gear 3 causes the bush member 12 to rotate, through the pin member 11, around the axis $O_4$ and is transmitted to the lever member 10. This causes a wide rotation angle of the bush member 12 around the axis $O_4$ when the main gear 3, the lever member 10 and the crankshaft 8 are rotated once all together.

Figure 11:
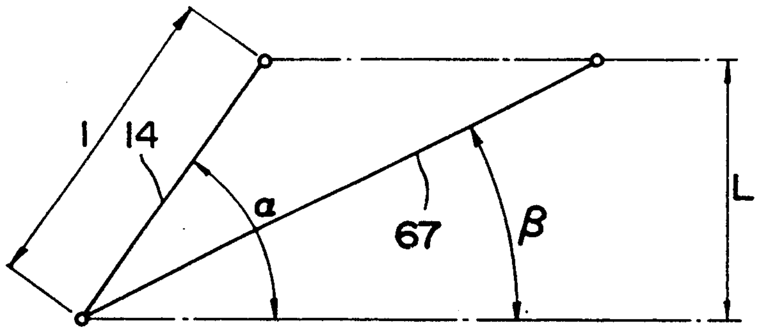
FIG. 11 PRIOR ART
FIG. 11 is an explanatory view of the link swing angle in order to obtain certain length.

As described above, the slide motion Q, drawn in FIG. 8 for a high precise pressing of material, can be obtained by the length L drawn in FIG. 11 which causes a deviation of the rotation speed of the crankshaft. While, in this invention, since the rotation angle of the bush member 12 around the axis $O_4$ can be made widely, a swing angle $\alpha$ of the link 14, which has a length I equal to the distance between two axes $O_4$ and $O_5$ as can be seen from FIG. 11, becomes wide. Therefore, according to the present invention, to obtain the length L of the link 14 having the distance I is easier than by the link 67 shown in FIGS. 6 and 11.

Consequently, the necessary length L can be kept, even though the distance $e_1$, which is a distance between the axis $O_1$ for the main gear 3 and the axis $O_2$ for the lever member 10 and the crankshaft 8, is made short. This means that the slide motion Q in FIG. 8 can be achieved by the short distance $e_1$, so that a rotatable center portion influenced by the distance $e_1$, that is, such portions as the crankshaft 8, the bearing member 6, or the like, will become small in size. This is therefore desirable for the apparatus to minimize its size.

In the disclosed embodiment, the pin member 11 was provided at the side of the main gear 3 and the bush member 12 was done at the side of the lever member 10. However, this arrangement can be changed around.

The connecting member 13 to join the rotational drive member with the driven member consists of the pin member 11 and the bush member 12 in the mentioned embodiment. However, the connecting member 13 may be a single link having a rod shape.

The employed rotational drive member is the main gear 3 driven by the pinion 2 in this embodiment, but is it also available to be a gear train or a disc-like member or a lever member which is driven by the drive shaft 1. The corresponding driven member is also not limited to be the lever member 10, but a disc-like member or a lever member formed with the crankshaft 8.

According to the present invention, the rotational center portion where the eccentric portion in the apparatus is provided can be made small in size. Therefore, totally, the apparatus can be made small in size, some members employed in the apparatus can be processed easily and then the working efficiency and the necessary cost for production of the apparatus should be improved.

What is claimed is:

1. An apparatus for driving a slide with a crankshaft and a connecting rod in a press machine, comprising:

a rotational drive member capable of being rotated by a drive source and a corresponding driven member fixed to the crankshaft, such that both axes of the rotational drive member and the driven member are separated and opposed to one another; and a connecting member having two connecting centers, the first of which separates from the axis of the rotational drive member and is to be connected with the rotational drive member, the second of which separates from the axis of the driven member and is to be connected with the driven member, so that a drive rotation locus of the first connecting center around the axis of the rotational drive member and a driven rotation locus of the second connecting center around the axis of the driven member intersect one another, an eccentric portion of the crankshaft being connected to the slide through the connecting rod.

2. An apparatus in claim 1, wherein said connecting member includes a pin member, of which one end portion projects from one surface of either said rotational drive member or said driven member, and a bush member capable of rotating in a state to be coupled into said either member which does not have the pin member.

3. An apparatus in claim 1, wherein said rotational drive member is a main gear and said driven member is a lever member.

4. An apparatus in claim 1, wherein said rotational drive member is a disc-like member driven by the drive source through a gear train.

5. An apparatus in claim 1, wherein said driven member is a lever member formed with the crankshaft.

6. An apparatus for driving a slide by means of a crankshaft and a connecting rod in a press machine, comprising:

a rotational drive member capable of being rotated by a drive source and a corresponding driven member fixed to the crankshaft, such that both axes of said rotational drive member and said driven member are separated and opposed to one another;

a pin member of which one end portion projects from one surface of either said rotational drive member or said driven member along each axis; and a bush member capable of rotating in a state to be coupled into said either member which does not have said pin member, said pin member being coupled into said bush member at a distant point from an axis thereof and an eccentric portion of the crankshaft being connected with the slide through the connecting rod.

* * * * *